July 16, 1935.  F. G. MATRAVERS  2,008,217
STEERING GEAR FOR VEHICLES
Filed March 27, 1934
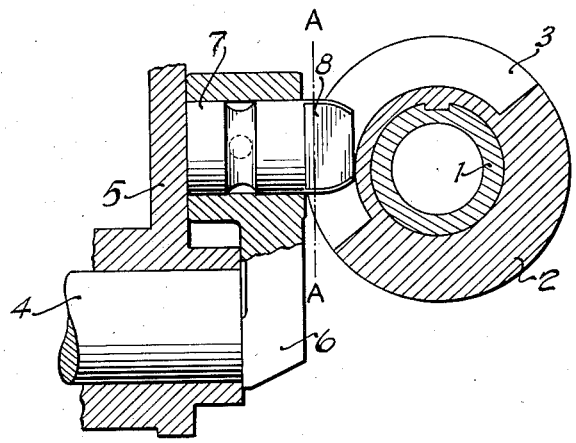
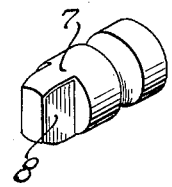
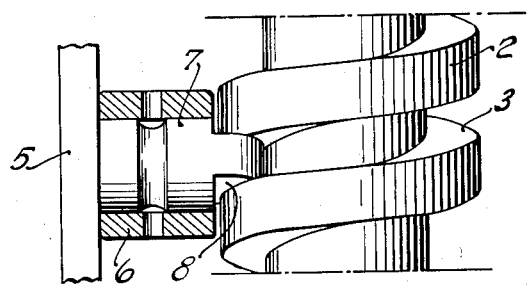
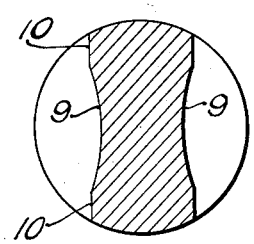
INVENTOR
Frederick G. Matravers,
BY
ATTORNEY Patented July 16, 1935

2,008,217

UNITED STATES PATENT OFFICE 2,008,217

STEERING GEAR FOR VEHICLES

Frederick George Matravers, Harpenden, England, assignor to Adamant Engineering Company Limited, Luton Bedfordshire, England, a company of Great Britain Application March 27, 1934, Serial No. 717,545
In Great Britain May 8, 1933

5 Claims. (Cl. 74—458)

Applications have been made for Letters Patent in Great Britain No. 13,382 filed 8th May 1933 and cognate No. 26,200 filed 22nd September 1933.

The present invention relates to steering gears for vehicles of the type in which a shaft or steering column adapted to be rotated by the driver is provided with a helical thread which is engaged by a block, projection or follower operatively connected to the road wheels of the vehicle.

In particular this invention relates to the type of steering gear in which the follower is rotatably mounted on a steering arm, which in turn is rotatable about the axis of a rocker shaft, the axis of rotation of said follower being parallel to the axis of said rocker shaft, and engagement between the follower and the helical thread taking place substantially in a plane which is parallel with the axis of the rocker shaft, and which passes through the axis of the steering column; that is to say engagement takes place at the side of the helical thread and not at the top or bottom of the thread.

In steering gears of this type, it has previously been found necessary to provide a block, projection or follower having contacting surfaces formed of separate members in conjunction with a thread or cam operated by a shaft, such separate members being able to swivel relatively to the projection or block; alternatively it has previously been found necessary to employ a block, projection or follower in conjunction with a cam, the thread of which has been generated from a centre which is approximately the centre of rotation of the member in which the block or projection is fitted.

In the first mentioned construction the block and its separate members have to be accurately formed and fitted together which of necessity makes the component expensive to produce, while in the second construction in which the follower coacts with a generated cam, the area of contact between the follower and the cam is so small that the efficiency of the steering gear is reduced by the excessively high pressures resulting between the two members when the gear is operated.

The object of the present invention is to provide a steering gear which has surface contact between the follower and the thread or cam, and which may be easily and cheaply constructed yet will be at least as robust and efficient as those previously constructed.

According to the present invention, in a steering gear of the particular type described, the follower comprises a single unit, in which either the contacting surfaces themselves are substantially parallel, or in which the lines of intersection between the said surfaces and any plane perpendicular to the axis of rotation of said follower are substantially parallel.

The invention is shown by way of example in the accompanying drawing in which:—

Figure 1 is a vertical section through the rocker shaft of a vehicle steering gear according to the invention.

Figure 2 is a plan view of Figure 1,

Figure 3 is a perspective view of the follower,

Figure 4 is a section on the line A—A of Figure 1 showing on an enlarged scale the contours of the contacting surfaces of one form of follower.

Referring to Figure 1 the steering column 1 has keyed to it at its lower end a cylindrically shaped member 2 in which there is a helical groove or thread 3. The member 2 is so positioned that the helical groove or thread 3 is co-axial and rotatable with the steering column 1.

A rocker shaft 4 is journalled in the steering box casing 5 and at one end is integral with a steering arm 6. At the other end of the rocker shaft 4 a lever or drop arm, not shown in the drawing, is mounted on splines or by other similar means, and is operatively connected to the road wheels of the vehicle.

A follower 7 is journalled in the steering arm 6 so that its axis of rotation is parallel to the axis of the rocker shaft 4. One end of the follower 7 is in contact with the inner surface of the steering box casing 5 and the other end engages the helical thread 3. This latter end of the follower has two substantially flat side surfaces 8 so designed as to make surface contact with the sides of the helical thread 3. It should be understood that the word "substantially" is used to qualify the form of the side surfaces of the follower so as to include all the slight variations in its contour which are hereinafter described and claimed.

As shown in the drawing the helical thread is of substantially square cross-section, but it should be understood that in some circumstances the helical thread may be tapered, that is to say the distance between its two surfaces is less at the bottom of the thread than at the top. Also in the drawing the pitch of the helical thread is constant, but in some circumstances the pitch of the thread may vary at different points on the member 2.

As shown in the drawing the side contacting surfaces 8 of the follower are substantially parallel; if the helical thread is tapered the side contacting surfaces will be formed to fit this tapered thread and in this case the lines of intersection between the surfaces and any plane perpendicular to the axis of rotation of the follower will be substantially parallel.

The side contacting surfaces 8 of the follower 7 are so formed as to give free movement through its travel and at the same time to eliminate practically all movement laterally between the follower and the thread. To obtain this result the side contacting surfaces 8 of the follower may vary slightly from plane surfaces and may be convex or concave or alternatively one or both of these surfaces may be any combination of plane, concave and convex surfaces, or any combination of any two such plane, convex and concave surfaces. The precise form of these surfaces will of necessity vary in gears having threads of different pitches and diameters and also in gears having steering arms of different lengths.

Figure 4 shows on an enlarged scale one variation in contour from plane surfaces, which the side contacting surfaces of the follower may take. In this figure both surfaces of the follower are provided with a shallow recess or groove at 9 arranged centrally and parallel to the axis of rotation of the follower and leaving the ridges 10 which develop into the recess 9 with a tapering curve.

If the gear is of the type using a helical thread of constant pitch as is usually the case, it will be understood that there is no necessity to ensure that the centre of the thread is assembled in any particular endwise position relatively to the steering arm, so long as the steering arm is able to travel to its full extent in both directions. It is seen therefore, that a gear made according to the invention is simpler to make, assemble, repair and adjust than those gears employing generated cams, which must of course be assembled in the exact endwise position relatively to the steering arm, in which they were originally generated.

Further it will be understood that in a gear made according to the invention a stronger and more substantial follower may be employed than in those gears comprising a multiple piece follower, whilst an area of contact between the operating parts equally as effective may be used, thus ensuring low pressure throughout the operations of the gear and a long life without replacements.

Since a gear made according to the present invention provides a follower which is not subjected to such high pressures as with the previous types of gear, and also since the gear made according to the present invention is on account of its robustness more able to withstand the pressures to which it is subjected than those previous gears, it will be understood that the helical thread may be shallower in depth than previously for gears having the same strength and life, thus reducing the outside diameter of the thread with a corresponding reduction in size of the steering box. It will readily be appreciated that such a reduction in size will result in a considerable cheapening in the cost of manufacture and material and also in providing a more compact form of gear.

The follower pin in this invention is manufactured in mass production and is produced from bar stock which has a circumferential groove in the body 7, to receive a lubricant in the socket 6. The engaging end 8 projects from the body at its greatest diameter to engage the groove of the worm on the steering post. This flattened end substantially fits the groove of the worm and is formed by removing part of the cylindrical stock on both sides. In operation it will be noted that the pressure transmitted by the worm to the follower is applied to one side only of the contacting surfaces 8 during the steering operation. The force applied to the follower is through the shear of the projection 8. For reliability and for long life, it is important that this projection be solid and that its cross section be as large as possible; the projection is therefore formed on the longitudinal centre of the cylindrical follower and it substantially fills the groove of the worm transversely.

It is important that a solid follower pin of this type operate without binding in the worm. For this purpose the cylindrical portion of the end of projection 8 in the groove of the worm thread is curved or tapered inwardly as indicated in Fig. 2, thereby avoiding sharp edges and facilitating the flow of lubricant between the engaging surfaces. Another important feature in preventing binding in the worm engagement is secured by dividing the area of contact of the projection 8 into a plurality of parts developed from the stock of the projection as indicated at 10 in Fig. 4 each of these parts on each engaging surface being on opposite sides of the axis of the rotating body 7. This division is produced by the shallow concavities at 9 which taper gradually outwards from the center of the body towards the engaging surfaces at the periphery. The contacting parts extend longitudinally of the pin and parallel with its axis and the spaces 9 form pockets for the lubricant. The spaced engaging surfaces form a couple about the centre of the follower pin to rotate it in socket 6 and to produce a smooth operation in the worm. The shallow concavities at 9 do not materially reduce the cross-section of the engaging member.

It will be noted from the end views that the projection 8 is symmetrical about the transverse axis of the pin 7 and it is equally operative with either side up.

The steering gear follower of this invention is made from round bar stock of uniform diameter with an engaging projection at the end, all of solid stock with a substantial cross section that is easily manufactured by automatic production and that can be uniformly tempered. The principal use of the invention is for steering gears in automobiles where reliability is of the unmost importance.

It should be understood that the end of the follower is substantially flat to conform to the contour of the worm which it engages, and that the substantially flat faces of this end are themselves, formed in ridges, or in a concavity relative to the engaging surfaces of the worm.

What I claim is:—

1. A follower pin for the steering gear of vehicles for transmitting motion between a worm on the steering shaft and the vehicle steering arm, comprising a cylindical body rotatably mounted in the steering arm and having a solid substantially flat projecting end on its longitudinal centre of substantially the same width as the groove of the worm for engaging the worm, said flat projecting end being of the same diameter as said body and having its cylindrical faces curved inwardly towards the end.

2. A follower pin for the steering gear of vehicles for transmitting motion between a worm on the steering shaft and the vehicle steering arm, comprising a cylindrical body rotatably mounted in the steering arm and having a solid substantially flattened end, said end projecting in the axial line of said body and engaging the groove of said worm, the substantially flat faces of said projection being concaved on the axial line of said body.

3. A follower pin for the steering gear of vehicles for transmitting motion between a worm on the steering shaft and the vehicle steering arm, comprising a cylindrical body rotatably mounted in the steering arm and having a solid substantially flattened end projecting on the axial line of said body and being of substantially the same width as the groove of the worm and engaging the worm, each face of said substantially flattened end having a pair of ridges parallel with the axis of said body and tapering into a concavity on the axial line of said body.

4. A follower pin for the steering gear of vehicles for transmitting motion between a worm on the steering shaft and the vehicle steering arm, comprising a cylindrical body rotatably mounted in the steering arm and having a solid substantially flattened end projecting on the axial line of said body and being of substantially the same width as the groove of the worm and engaging the worm, each face of said substantially flattened end having a pair of ridges parallel with the axis of said body and tapering into a concavity on the axial line of said body, and the cylindrical faces of said end curved inwardly at the end.

5. A follower pin for the steering gear of vehicles for transmitting motion between a worm on the steering shaft and the vehicle steering arm, comprising a cylindrical body rotatably mounted in the steering arm, said body having a solid substantially flattened end of substantially the same width as the groove of the worm and engaging the worm, each face of said substantially flattened end having a pair of parallel ridges tapering into the stock of the end, said ridges being parallel with the axis of said cylindrical body and equally spaced from said axis.

FREDERICK GEORGE MATRAVERS.